United States Patent [19]
Reynolds et al.

[11] Patent Number: 6,155,600
[45] Date of Patent: Dec. 5, 2000

[54] SAFETY AIR BAG INFLATION DEVICE

[76] Inventors: George L. Reynolds, Rte. #1, Box 32A, Altona, Ill. 61414; Charles M. Woods, 11395 US 127, West Manchester, Ohio 45382

[21] Appl. No.: 08/591,306

[22] Filed: Jan. 25, 1996

[51] Int. Cl.⁷ .................................................. B60R 21/26

[52] U.S. Cl. ................................. 280/741; 280/736; 222/3

[58] Field of Search .................................. 280/741, 736, 280/737; 102/530, 531; 222/3

[56] References Cited

U.S. PATENT DOCUMENTS

| | | | |
|---|---|---|---|
| 5,242,194 | 9/1993 | Popek | 280/737 |
| 5,301,979 | 4/1994 | Allard | 280/737 |
| 5,330,730 | 7/1994 | Brode et al. | 280/737.4 |
| 5,441,302 | 8/1995 | Robinson et al. | 280/736 |
| 5,462,307 | 10/1995 | Welder et al. | 280/737 |
| 5,494,312 | 2/1996 | Rink | 280/737 |
| 5,531,473 | 7/1996 | Rink et al. | 285/741 |
| 5,551,723 | 9/1996 | Mahon et al. | 280/737 |
| 5,553,889 | 9/1996 | Hamilton et al. | 280/736 |
| 5,602,361 | 2/1997 | Hamilton et al. | 102/288 |

*Primary Examiner*—Eric Culbreth
*Assistant Examiner*—F. Zeender
*Attorney, Agent, or Firm*—Frost & Jacobs LLP

[57] ABSTRACT

An air bag inflator providing a source of gas, releasable upon command, to inflate a supplemental inflation restraint (SIR) system commonly known as an automobile air bag. Provided is a pressure vessel containing one or more separate chambers for the purpose of storing gaseous fuel(s) and gaseous oxidizer(s) or liquid fuel(s) and liquid oxidizer(s) under pressure with helium as the primary filler gas. The primary function of the helium gas is to serve as a kinetic damper to modulate and control the reaction rate of the fuel(s) and oxidizer(s). Because of its low mass, high thermal conductivity and high heat capacity for its mass, helium is an excellent filler gas. In the case of the gaseous fuel(s) and oxidizer(s) a single chamber is provided. In the case of liquid fuel(s) and oxidizer(s), two or more separate housings are provided for storing the liquid fuel(s) and oxidizer(s). Along with the liquid fuel(s) and oxidizer(s) housings, two separate chambers containing pressurized helium are provided within the pressure vessel. The first helium chamber rapidly pressurizes upon initiation of a gas producing pyrotechnic igniter. This pressure acts on thin membranes on the first chamber side of the separate liquid storage housings to force the liquid fuel(s) and oxidizer(s) into the second chamber where the materials are atomized and mixed. The mixture is ignited by the arrival of hot gases from the igniter directed into the second chamber via the small diameter tube or orifice. The fuel(s) oxidizer(s) mixture burns to produce gaseous reaction products that are released into the air bag by bursting a controlled rupture burst disc.

9 Claims, 11 Drawing Sheets

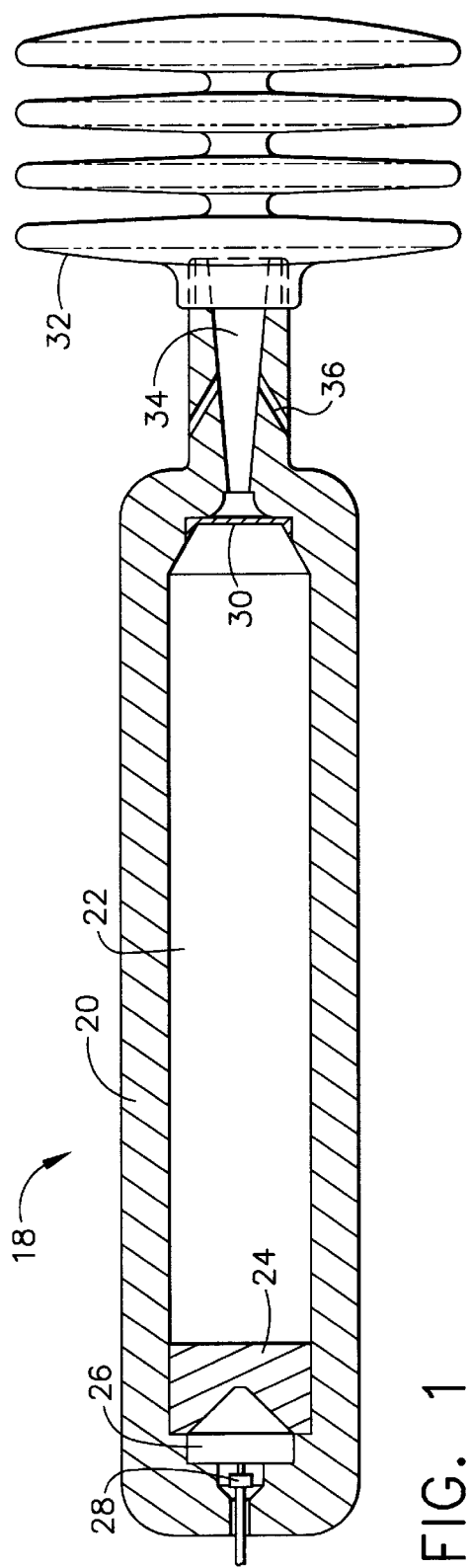
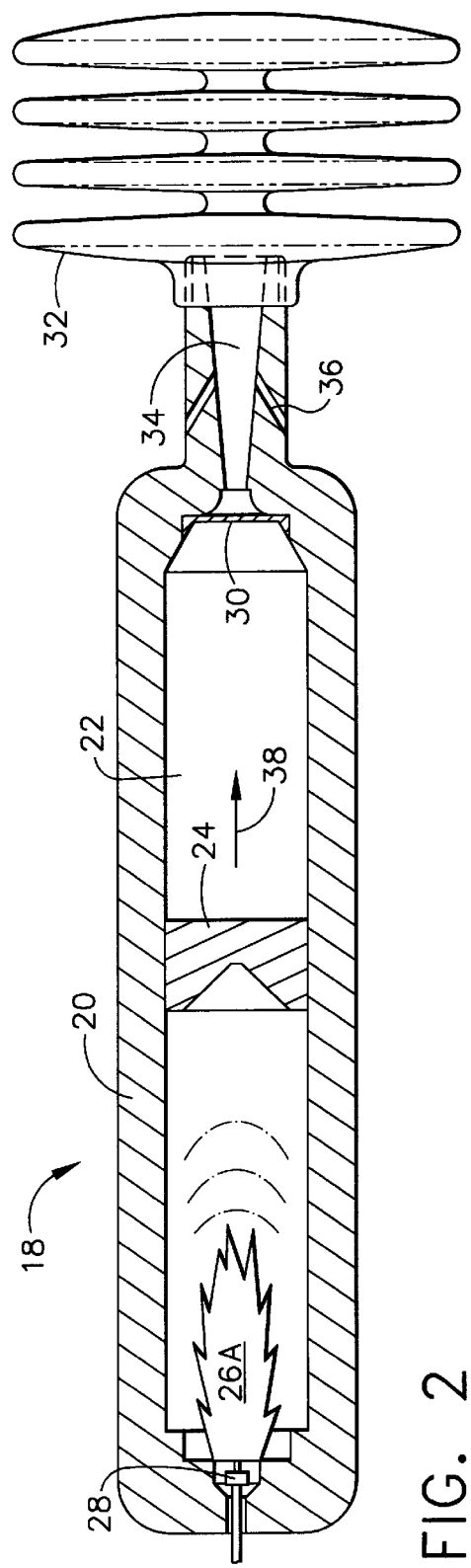

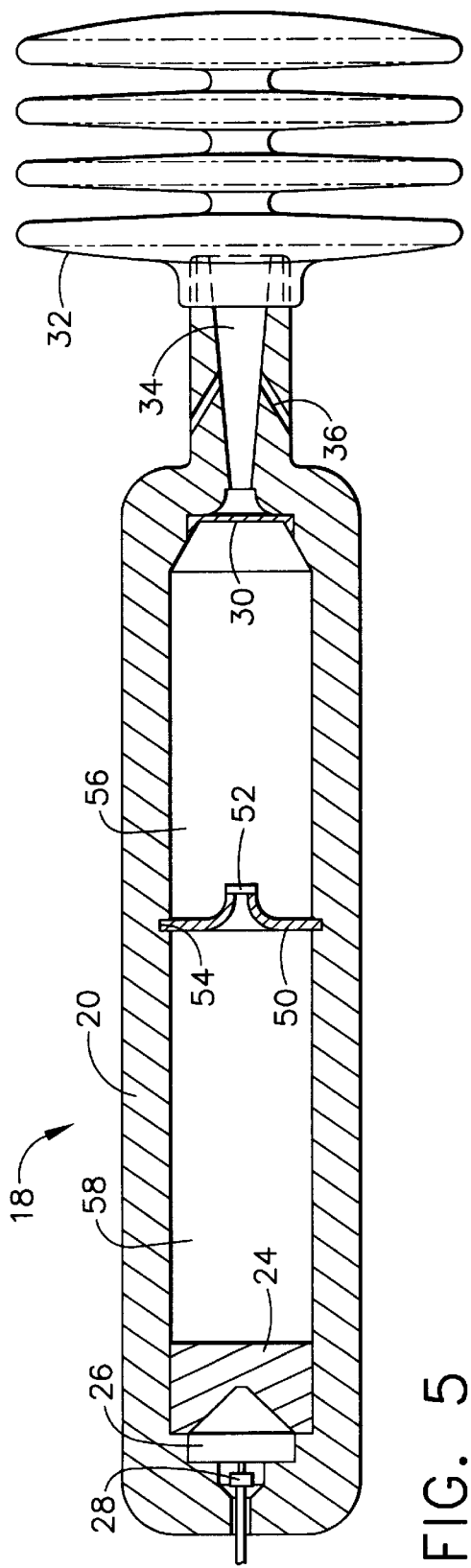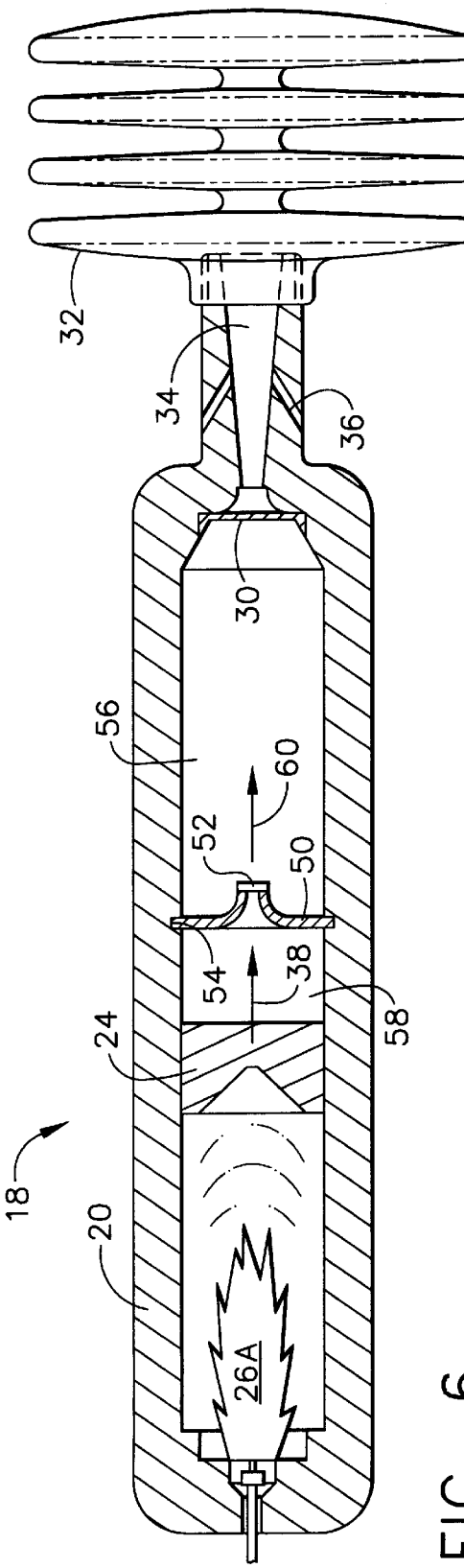

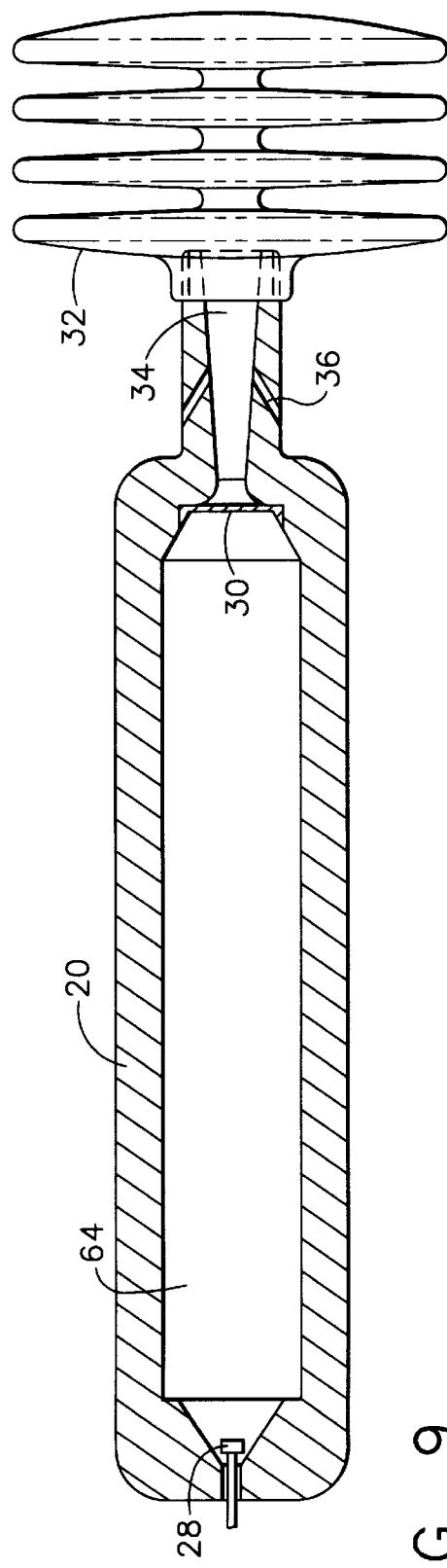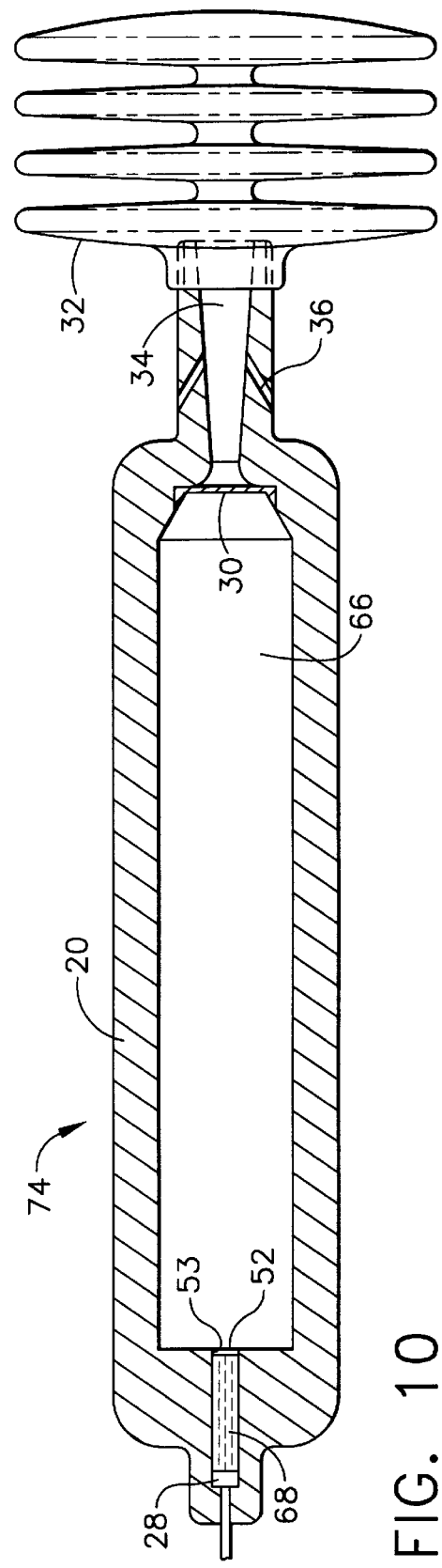

SAFETY AIR BAG INFLATION DEVICE

FIELD OF INVENTION

This invention is in the field of air bag inflation devices which generate pressurized gas and delivers the gas to an automobile safety air bag.

BACKGROUND OF INVENTION

Automobiles are equipped with safety devices commonly referred to as "Air Bags." Air Bags are designed to protect passengers from direct impact with hard interior vehicle parts in the event the vehicle is involved in a collision. If the vehicle is involved in a collision, a triggering system activates a device which rapidly inflates the air bag. The inflated air bag provides a cushion for the passenger to impact, reducing the chance of injury, or reducing the severity of injuries resulting from the collision.

Current air bag inflation devices operate quickly enough to meet current industry requirements. The need exists, however, for faster acting air bag inflation devices which will satisfy new industry requirements for dealing with higher speed front collisions and for certain side impact collisions.

Passengers sitting near vehicle doors are much closer to the point of collision during a side impact than they are to the dashboard or steering wheel during a front end collision. Conventional air bag inflation devices act too slowly, when inflating air bags in side doors, to protect passengers from severe side impacts.

Gas used to inflate air bags mush not be toxic or cause burn injuries to passengers, and it must not present environmental hazards in use or during disposal.

Currently, industry employs two types of air bag inflation devices. One type uses sodium azide blended with a suitable oxidant such as molybdenum-disulfide or potassium nitrite to control burn characteristics. Upon ignition, these devices produce predominantly nitrogen gas which evolves from thermal decomposition of the sodium azide. Unfortunately, sodium azide is both explosive and a very toxic poison. This creates a major risk to passengers, and presents serious disposal problems.

The second type of device, referred to as a hybrid, involves the storage of an inert gas (e.g. argon) under pressure along with a pyrotechnic or propellant. This propellant serves two functions. First, at ignition the propellant produces heat and gas which pressurizes the argon gas so that the argon ruptures a rupture disc (or activates another suitable release mechanism) to deliver the argon to the air bag. Second, in some designs, the propellant itself produces gas which adds to the stored argon gas pressure for release into the air bag.

In both the azide and hybrid designs, there is a significant quantity of pyrotechnic material which, when burned, produces substantial particulate reaction products. Great engineering effort is required to filter these particulates from the gas delivery stream in order to meet the industry requirements for maximum allowed quantities of particulates delivered to the air bag. There are also small quantities of toxic gases given off by the burning pyrotechnics. It is very difficult to tailor the pyrotechnic mixture to sufficiently reduce toxic effluents to meet industry standards.

Both the hybrid and azide technologies require major engineering studies to formulate pyrotechnic chemical compositions, particle sizes and distributions, and ignition train mechanisms which satisfactorily control the chemical and pressure-time delivery characteristics of the inflation device. This means that variations in pressure-time delivery requirements between one car model and another require major engineering effort. In most cases, this also requires reconfiguration of the containment vessel and mounting hardware.

SUMMARY OF PRESENT INVENTION

The present invention is applied to automobile safety air bag systems. In one form, a propellant explosive is employed to propel a moveable piston to further compress pre-pressurized gas. The propellant explosive, piston and pre-pressurized gas are sealed within a cylinder by a precision rupture disc. The cylinder is provided with a solid chemical explosive electrically activated initiator. When the propellant explosive is ignited by the initiator, the burning propellant explosive drives the piston to further pressurize either a noncombustible or combustible pre-pressurized gas on the other side of the piston. When the precision rupture disc fails, the highly pressurized gas is released through a venturi into the air bag, inflating the air bag. Other forms of the invention do not use a piston, but inert gas along with the products of combustion, directly fill the air bag.

Briefly, there are four major concepts. The first concept involves an active, mechanical pressurization of a stored prepressurized inert gas, such as argon or helium, contained in a cylinder under pressure. A gas-producing, energetic material contained behind a moveable piston is ignited. The energetic material burns, producing hot, expanding gas which propels the piston to further compress the prepressurized inert gas. A precision disc ruptures at a predetermined pressure, releasing gas into the air bag. The piston continues to force gas out of the cylinder, providing a continuous high pressure driving force which adds enough energy to keep the gas from cooling significantly. Finally, the piston embeds itself into the end of the cylinder, providing a seal which prohibits propellant gases from reaching the air bag. The propellant gases (now predominantly water) then cool and condenses inside the cylinder while still totally contained. Thus, a pure inert gas is delivered to the air bag. No particles or toxic gases are delivered.

The second concept involves using inert gas to kinetically deep reactions in combustible gas mixtures. As used herein, "inert" means chemically non-reactive. As used herein, "kinetic" refers to the rate or speed at which the chemical reaction take place between the reactive components of the system and molecular interactions thereof. As used herein, "damping" refers to the modulation and control of the rate of chemical reaction and the molecular interaction thereof. Therefore the presence of the inert kinetic damping gas molecules modulates and controls the chemical reaction rate of combustion and thereby the molecular reaction products formed. A mixture of prepressurized gases made up of an inert kinetic damping gas (e.g. argon or helium), along with oxygen, and a fuel gas (e.g. propane, hydrogen or any other combustible gas) is contained in a cylinder. This gas mixture is ignited by an energetic initiator, such as one containing 100 milligrams of zirconium potassium perchlorate. The combustible gas burns with the oxygen to produce a hot gas which further pressurizes the cylinder to burst a rupture disc, releasing the gas reaction products into the air bag. The proper ratio of oxygen, combustible gas and inert kinetic-damping gas, in conjunction with varying the precision rupture disc design parameters, permits reaction rate control that is both accurate and reproducible. This system permits precise tailoring of the reaction products, and their delivery rate of specific air bag requirements. The key to this concept is the kinetic damping effect of the inert gas. Varying the fuel-gas/oxygen ratios and the pressure of the inert kinetic-damping gas through a wide range of compositions results in fuel/oxygen mixtures which are incombustible at one extreme, exhibit controlled combustion over a range of compositions, and exhibit detonation mixtures at the other extreme. The precision rupture disc design parameters are very important in this concept since the burst pressure and containment time govern the extent of the reaction and the reaction product ratios.

When combustible gases contain carbon (e.g. propane), the ratio of carbon dioxide to carbon monoxide must be controlled to minimize production of carbon monoxide in order to meet stringent delivery requirements. When the combustible gas is hydrogen, the predominant reaction product of hydrogen and oxygen is water vapor. Therefore, using hydrogen as the fuel results in water vapor, along with the inert gas and a small amount of excess oxygen being delivered to the air bag. Toxic gas and particulate problems are totally eliminated. Since in this design the gases can be stored at relatively low pressures, inflater design is significantly simpler then present designs.

The third concept involves injecting a combustible liquid (e.g. ethanol) into a mixture of oxygen and inert kinetic-damping gas. The mixture is ignited, producing carbon dioxide, water vapor and inert gas. The inert gas kinetically damps the reaction, preventing detonation, and controlling the reaction rate. The reaction produces heat and gas which pressurizes the cylinder to burst a precision rupture disc. As in the former design, the precision rupture disc design plays a very important part in controlling the extent of the reaction.

The fourth concept involves injecting two reactive liquids (e.g. hydrogen peroxide and methyl alcohol, among many other combinations such as hydrogen peroxide and other combustible liquids) from separate storage cells into a combustion chamber containing a mixture of prepressurized oxygen and inert kinetic-damping gas. The combining liquids are ignited, producing heat and gas which pressurize the cylinder to burst a precision rupture disc. As in the former design, the precision rupture disc plays a very important part in controlling the extent of the reaction.

There are many advantages to each of these four design concepts. Their construction requires only inexpensive and non-toxic materials. Delivery gases avoid particulate problems and can be made totally non-toxic. A wide range of delivery requirements can be easily met without major engineering effort or hardware changes. Fabrication technology is fairly simple and far less hazardous to employees than current technologies. The fabrication technology is much less capital intensive than current technologies, and disposal costs are minimal when compared to present practice.

In a first embodiment, the pre-pressurized gas is non-combustible. The moving piston further pressurizes the pre-pressurized gas until the precision rupture disc fails at a predetermined pressure, releasing the highly pressurized gas into the air bag.

In a second embodiment, the pre-pressurized gas consists of a combustible gas, oxygen and an inert kinetic-damping gas. The gas mixture is capable of compression ignition. The moving piston compresses the gas mixture, raising the gas temperature to the auto-ignition point. The inert kinetic-damping gas prevents detonation and controls combination. The ignition gas further increases the cylinder pressure until the precision rupture disc fails at a predetermined pressure, releasing the gas into the air bag.

In a third embodiment the device is much like the second, except that two or more pre-pressurized hypergolic or compression ignition gases, separated by baffles, are used. An inert kinetic-damping gas and a precision rupture disc are used.

In a fourth embodiment no piston is used. The ignition of combustible propellant gases mixed with inert kinetic-damping gas directly inflates the air bag. When ignited, the combustion of fuel and oxygen adds heat, causing the cylinder pressure to rise bursting the precision rupture disc at a predetermined pressure. Combustion products filling the air bag are a mixture of safely breathable inert gas, oxygen and water vapor, along with very small, acceptable traces of other gases. The expanded cylinder is left empty and inert.

In a fifth embodiment a liquid fuel is injected into a pre-pressurized mixture of oxygen and inert kinetic-damping gas, or a liquid oxidant is injected into a pre-pressurized mixture of hydrogen and inert kinetic-damping gas. The liquid fuel along with the high temperature igniter products are rapidly dispersed into the oxygen/inert gas mixture, igniting the dispersing fuel. Likewise the liquid oxidant along with the high temperature igniter products are rapidly dispersed into the hydrogen/inert gas mixture, igniting the mixture. Combustion of the fuel/oxidant mixture generates gas and heat, causing the cylinder pressure to rise, bursting the precision rupture disc at a predetermined pressure. Combustion products filling the air bag are a mixture of safely breatheable gases, consisting of inert gas, oxygen and water vapor, along with acceptable traces of other gases. The expended cylinder is left empty and inert.

In a sixth embodiment two separately stored reactive liquids are injected and ignited in a combustion chamber containing pre-pressurized inert kinetic-damping gas and a small amount of oxygen. Combustion of the fuel generates gas and heat, causing the cylinder pressure to rise, bursting a precision rupture disc at a predetermined pressure. Combustion products filling the air bag are a mixture of safely breatheable gases, consisting of inert gas, oxygen and water vapor, along with acceptable traces of other gases. The expended cylinder is left empty and inert. A precision rupture disc is used.

The reference precision rupture disc is a crucial part of the design of these devices. It is a relatively thin metal disc inscribed with a pattern of grooves which serve as stress risers. The precision rupture disc are indefinitely contain the pre-pressurized gases stored in the device. The inscribed grooves accurately induce and control failure of the precision rupture disc when the device is activated. The rupture disc opens into a pattern of corresponding recesses inside the venturi empty, directing a smooth flow of gas into the air bag.

The precision rupture disc affects the inflation device in several ways. The total pressure before rupture governs both the reaction product ratios, and the extent of reaction before rupture. The sudden drop of pressure which occurs when the precision rupture disc fails quenches the reaction. This prevents expelling burning gases into the air bag. The extent of disc deformation before rupture governs the total reaction time and the time to first pressure in the bag. The sharp internal corners in the bottom of the inscribed grooves on the precision rupture disc serve as stress risers which induce the precision rupture disc to fail along the inscribed grooves. Failure along these grooves results in the forming of "V" shaped petals which plastically deform into their corresponding recesses at the entrance to the venturi. The shape of the entrance to the venturi acts as a kinetic energy absorber to collect the petals as they deform, not allowing the petals to accelerate toward the venturi opening. This guarantees that no disc petals will be torn off and ejected into the air bag. The deformed petals also determine the effective gas orifice size, which, in turn, governs the rate at which the inflating gas will pressurize the air bag.

The expansion portion of the venturi is provided with inlets through which ambient air is drown by the Bernoulli effect created by the rapidly moving inflater gas as it traverses the surface of the venturi and empties into the air bag. This resulting mixture of non-toxic gas and ambient air rapidly inflates the air bag. The addition of ambient air permits the total device to be small and to use a higher initial gas temperature while keeping the final ejected gas temperature at an acceptable level. None of the aforementioned devices, however, requires these air inlets in the venturi to operate properly. The venturi technology just allows for smaller, higher temperature versions of the device.

Several of the devices or combinations of components can be arranged in a battery tailored to various passenger weights, passenger in-car positions, and to specific vehicle collision velocities.

BRIEF DESCRIPTION OF THE DRAWINGS

FIGS. 1 through 12 are elevational side views in section in which parts have been broken away to show operational elements as they function.

FIG. 1 shows the device equipped with a piston. The device is in its installed condition, at rest, and ready to function.

FIG. 2 shows the same device as in FIG. 1, except that the propellant explosive has been ignited by the initiator, and the propellant gases are driving the piston.

FIG. 3 shows the same device as FIGS. 1 and 2, except that the precison rupture disc has burst, and pre-pressurized gas is filling the air bag. The piston is still being driven by the propellant gases.

FIG. 4 shows the same device as FIGS. 1–3, but with the air bag completely filled. The piston is at rest with the expended propellent gases sealed with the cylinder by the piston which is blocking the entrance to the venturi.

FIGS. 1–4, show a first embodiment in which a prepressurized, non-combustible gas may be used, or in a second embodiment a pre-pressurized, combustible, compression-ignited gas may be used instead.

FIG. 5 shows a third embodiment similar to that shown in FIG. 1, but the device is equipped with a baffle having a membrane which separates two different component gases.

FIG. 6 shows the same device as FIG. 5, except that the initiator has functioned, and the piston is being driven by propellant gases. The membrane has ruptured, and the component gases are being mixed.

FIG. 7 shows the same device as FIGS. 5 and 6 with the piston continuing to be driven by the propellent gas, and the piston having sheared off the baffle. The reaction gases have been ignited, but the precision rupture disc has not yet failed.

FIG. 8 shows the same device as FIGS. 5–7, with the air bag in the process of being filled after the precision rupture disc has failed.

FIG. 9 shows a fourth embodiment of the device, which omits the piston, and having a mixture of oxygen, fuel gas and an inert kinetic-damping gas. The device is in its installed condition, at rest and ready to function. A precision rupture disc is used.

FIG. 10 shows a fifth embodiment which omits the piston, and having a mixture of oxygen and an inert kineticdamping gas. A membrane segregates a small amount of liquid fuel from the gas mixture. Here, the device is at rest in its installed condition and ready to function. A precision rupture disc is used.

FIG. 11 shows the same device as in FIG. 10, but here the initiator has functioned, and injected liquid fuel into the oxygen and inert kinetic-damping gas.

FIG. 12 shows a sixth embodiment which omits the piston, and uses a mixture of oxygen and inert kineticdamping gas, and which is equipped with liquid fuel injectors of two different capacities. A precision rupture disc is used.

FIG. 13 is a front view of the precision rupture disc before rupturing.

FIG. 14 is a sectional view of the precision rupture disc following rupture. The petals of the precision rupture disc have blended with the corresponding recesses in the venturi entrance (not shown), forming a smooth venturi.

FIG. 15 is a front view of the precision rupture disc following rupture.

FIG. 16 is a graphic illustration of typical measured performance of one form of the present invention, which exceeds 1999 model year requirements.

FIG. 17 shows a seventh embodiment which omits the piston, and having two separately stored reactive liquids, and pressurized with an inert kinetic-damping gas. Membranes segregate two small cells of liquid fuel from each other and from the inert gas. Here, the device is at rest in its installed condition and ready to function. A precision rupture disc is used.

FIG. 18 shows the same device as in FIG. 17, except that the initiator has been activated, the two reactive liquids have been injected into the combustion chamber and ignited, bursting the precision rupture disc.

DETAILED DESCRIPTION OF ILLUSTRATIVE EMBODIMENTS

Figure 3:
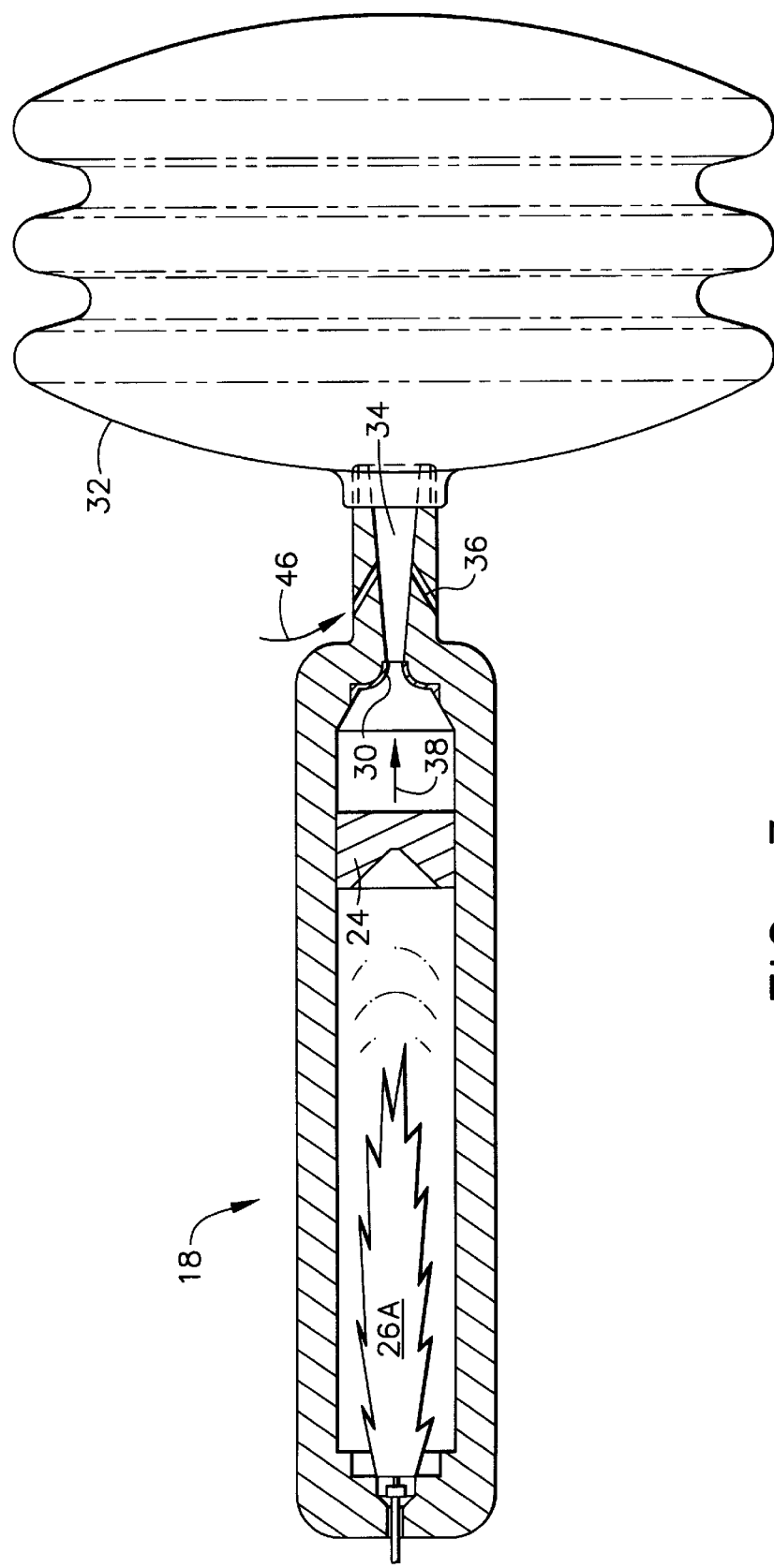

Reference is made to FIG. 1 which shows device 18 in its installed condition, at rest and ready to function. The cylinder 20 is a strong structural member containing a pre-pressurized gas 22 (e.g. argon or helium or a mixture of hydrogen, oxygen, and an inert kinetic-damping gas, such as argon of helium), a piston 24, propellant explosive 26, initiator 28, and a precision rupture disc 30. An air bag 32 is connected to cylinder 20 by a venturi 34. The venturi 34 is provided with several air inlets 36.

The pre-pressurized gas 22 can be a chemically inert gas in a first embodiment, or it can also be a mixture of fuel and oxidizer capable of compression ignition, along with an inert kinetic-damping gas in a second embodiment. The prepressurized gas 22 is sealed within the walls of the cylinder 20 by initiator 28 and by rupture disc 30. The rupture disc 30 is the weakest structural member containing the prepressurized gas 22. The precision rupture disc 30 is sufficiently strong to contain and seal indefinitely the prepressurized gas 22 within cylinder 20. The pre-pressurized gas 22 is maintained at pressure until the initiator 28 ignites the propellant explosive 26. The piston 24 separates, but does not hermetically seal the pre-pressurized gas 22 from the propellant explosive 26. Therefore, propellant explosive 26 is also pressurized with the same pressure as the pre-pressurized gas 22, equalizing pressure on both sides of the piston 24. The initiator 28 is installed within the cylinder 20 in such a way as to permanently seal the cylinder 20. The venturi 34 communicates with the interior of the air bag 32 and with the ambient air via the air inlets 36. The precision rupture disc seals the pre-pressurized gas 22 within the cylinder 20.

Referring now to FIG. 2, wherein is shown the same device as FIG. 1, except in FIG. 2, the device 18 is beginning to function. The initiator 28 has been activated by the vehicle collision detection system (not shown). In this figure, the propellant explosive 26 in FIG. 1 has been ignited and is being converted to propellant gas 26A. The propellant gas 26A has developed sufficient pressure to begin driving piston 24 toward rupture disc 30 to further pressurize the pre-pressurized gas 22. The pressure in the pre-pressurized gas 22 has not yet become high enough to burst rupture disc 30.

Referring now to FIG. 3, wherein is shown the device 18 during mid-function. The piston 24 has been driven sufficiently by the propellant gas 26A toward rupture disc 30 to compress and increase the temperature in the pre-pressurized gas 22 to auto-ignite the pre-pressurized gas if it is combustible. The pressure in the pre-pressurized gas 22 has now become high enough to burst the precision rupture disc 30. The precision rupture disc 30 has failed along the pre-inscribed grooves 40 in FIG. 13, so that the petals 42 in FIG. 14 of the rupture disc 30 open into their corresponding pattern 44 in the end of cylinder 20, in FIG. 15. The pre-pressurized gas 22, having been released by the failed rupture disc 30, is moving rapidly through the venturi 34 and into air bag 32. Ambient air 46 is being drawn, by the Bernoulli effect, through air inlets 36 and is mixing with the pre-pressurized gas 22.

Figure 4:
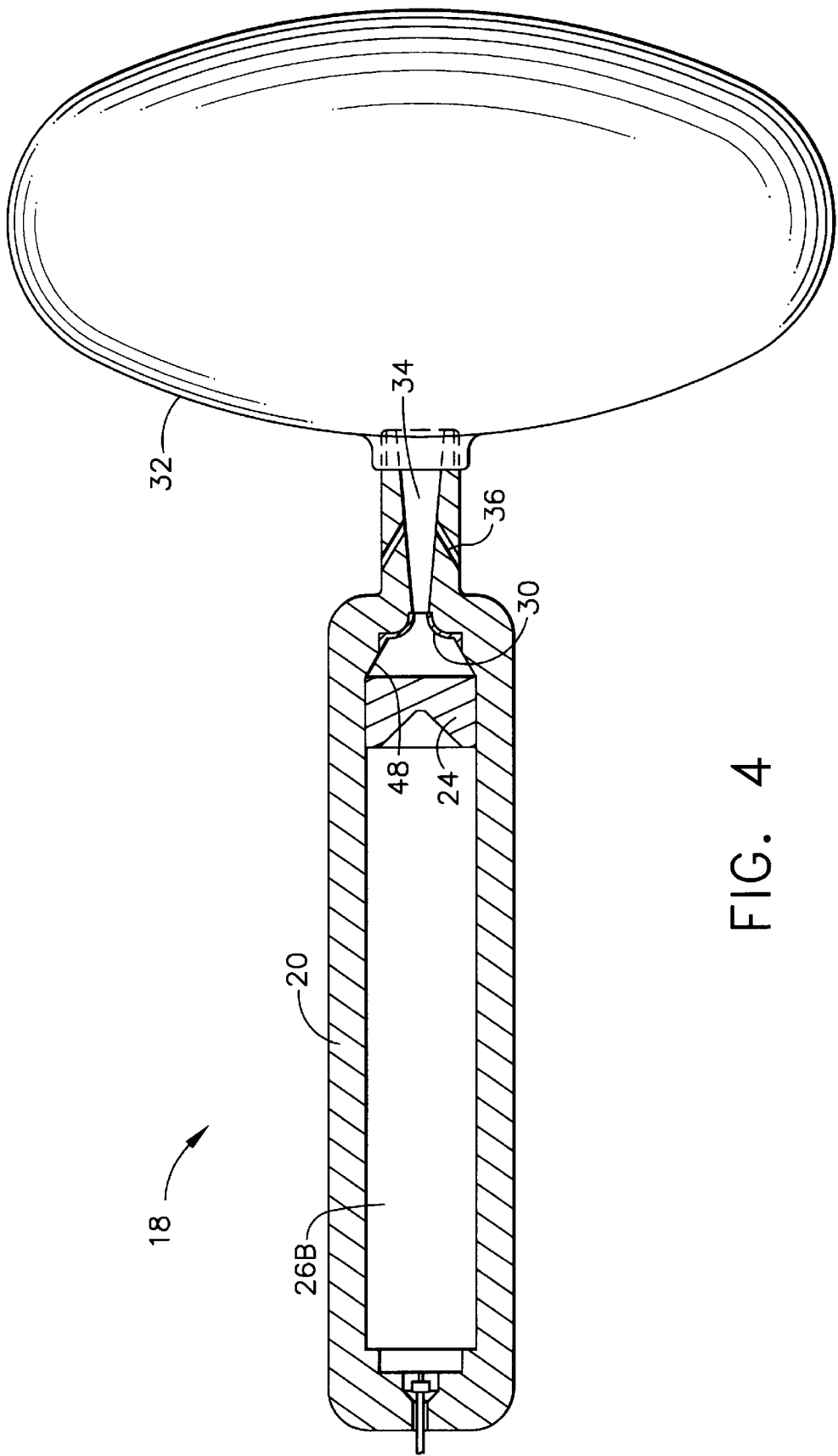

Referring now to FIG. 4, wherein is shown the air bag 32 completely inflated. The piston 24 has stopped, having wedged itself into the beveled portion 49 of cylinder 20 and rupture disc 30. The expended propellant gas 26B, still under residual pressure, is trapped within cylinder 20 by the piston 24. The expended propellant gas 26B remains sealed at a safe pressure.

Referring now to FIG. 5, which is similar to FIG. 1, wherein is shown the device 18 in its installed condition, at rest and ready to function. In this case the device 18 is shown with a baffle 50, provided with a membrane 52. This baffle 50 fits within retaining groove 54 in the inner surface of cylinder 20. The baffle 50 with membrane 52 forms a gas tight seal to isolate component gas 56 (e.g. hydrogen and helium) from component gas 58 (e.g. oxygen). Component gases 56 and 58 are dissimilar gases and are prepressurized. Component gases 56 and 58 can be gases which are ignited by compression ignition when mixed and compressed, or they can be hypergolic gases which will self ignite when mixed, regardless of further compression. Also, component gas 56 can be a combustible gas mixture capable of compression ignition, and component gas 58 may be an inert gas.

Referring now to FIG. 6, wherein is shown the same device as shown in FIG. 5 except that the device 18 is beginning to function. The initiator 28 has been activated by the vehicle collision detection system (not shown). The propellant gas 26 in FIG. 5 has been ignited and is being converted to propellant gas 26A. The propellant gas 26A has developed sufficient pressure to drive piston 24 toward rupture disc 30, rupturing membrane 52, and further compressing pre-pressurized component gas 56 and component gas 58. The membrane 52 of the baffle 50 is designed to fail when there is a relatively small pressure differential between component gas 56 and component gas 58, so that membrane 52 fails soon after piston 24 begins to move. This increases the pressure of component gas 58. The baffle 50 is anchored in retaining groove 54 in cylinder 20, preventing movement of the baffle 50. Component gas 58 passes through the opening in baffle 50, created by the removal of the membrane 52, as shown by arrows 60. The differential pressure between gases 56 and 58, caused by movement of piston 24, coupled with the nozzle effect of the opening in baffle 50 causes the component gas 56 and component gas 58 to be rapidly mixed in the space formerly occupied by component gas 56. The pressure in the mixed component gas 56 and component gas 58 has not yet become high enough to burst the precision rupture disc 30.

Figure 7:
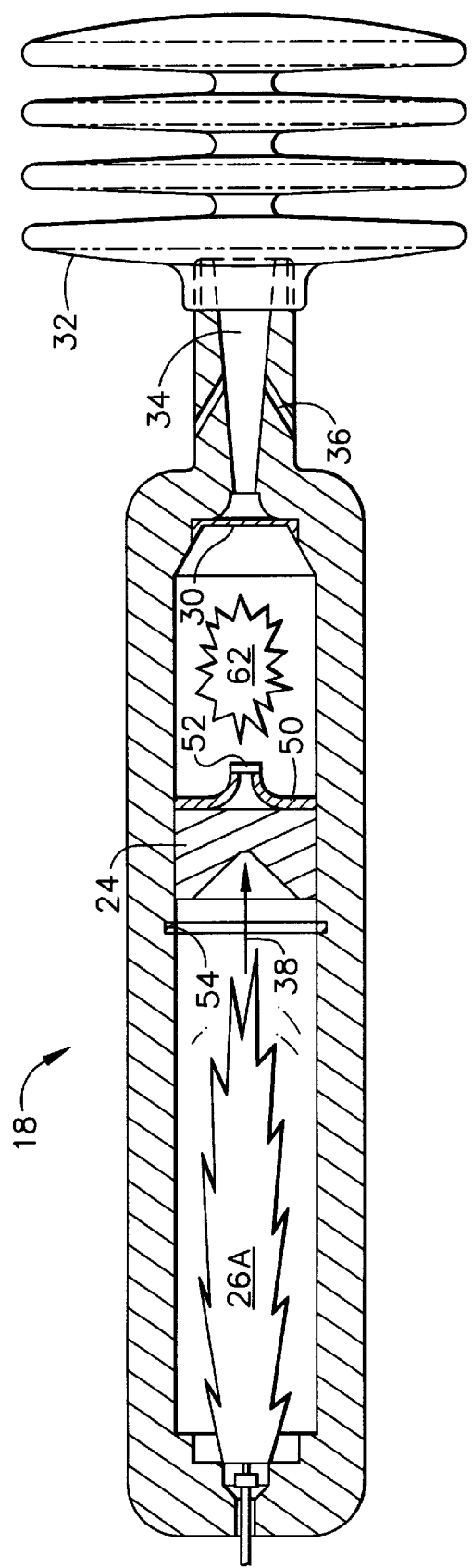

Referring now to FIG. 7, wherein is shown the same device 18 as is shown in FIGS. 5 and 6, except that the piston 24 has travelled far enough toward rupture disc 30 to shear the baffle 50 from its retaining groove 54, leaving an annular portion of the baffle 50 in retaining groove 54. The piston 24 is directly contacting and pushing the baffle 50. The reaction gas 62 (resulting from the combustion of component gas 56 and component gas 58 in FIG. 6) has not yet reached sufficient pressure to burst the precision rupture disc 30.

Figure 8:
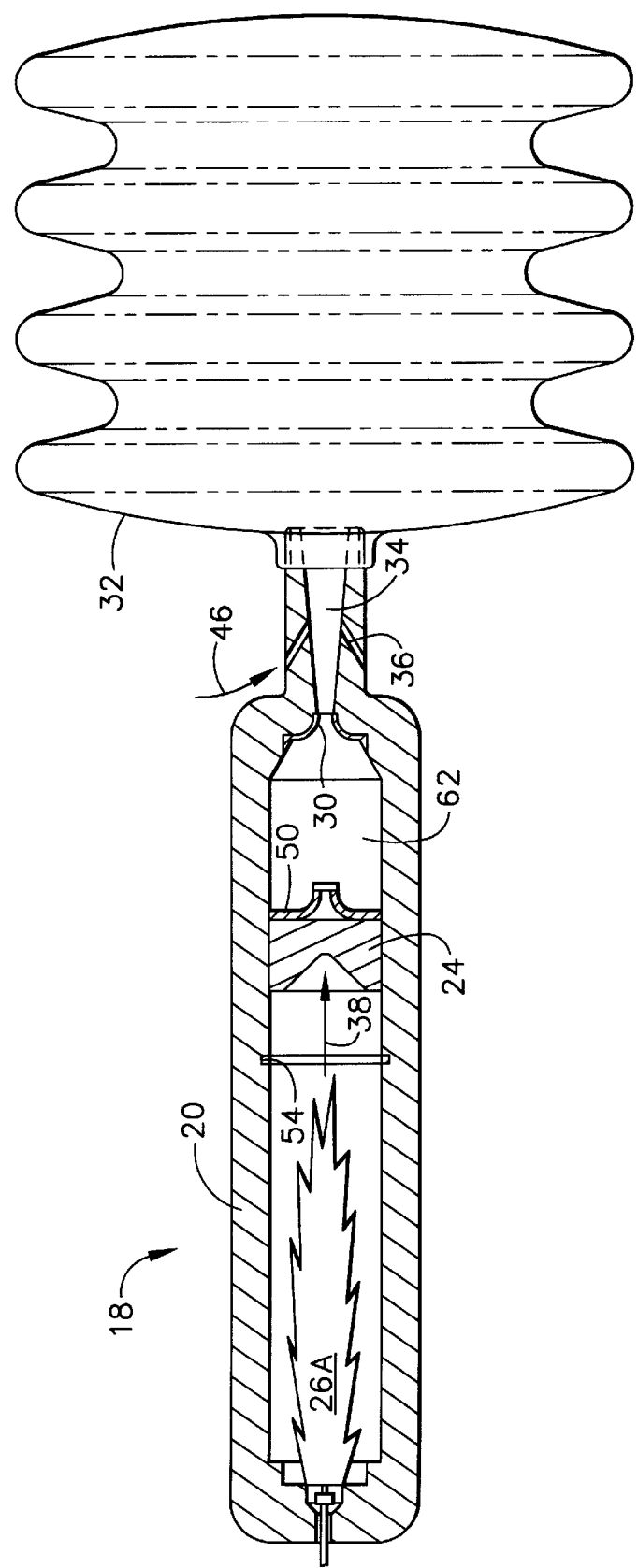

Referring now to FIG. 8, wherein is shown the same device 18 as is shown in FIGS. 5–7, except the device is now shown nearing the completion of its function. The pressure in the reaction gas 62 has become sufficiently high that the precision rupture disc 30 has burst. Piston 24 continues to be driven by the propellant gas 26A toward rupture disc 30 in order to expel the reaction has 62 through venturi 34. Air bag 32 will be filled completely to the same condition as shown in FIG. 4.

Referring now to FIG. 9, wherein is shown the referenced fourth embodiment in which no piston is used. A pre-pressurized mixture of combustible has 64 (e.g. Oxygen and hydrogen) and inert kinetic-damping gas (e.g. argon or helium) is sealed within cylinder 20. The initiator 28 will ignite combustible gas 64, causing the pressure in cylinder 20 to increase until the precision rupture disc 30 fails. A pressurized mixture of fuel gas and oxidizer alone would detonate, shattering the containment vessel. The inert kinetic-damping gas, used in the correct proportions prevents detonation of the fuel gas and oxidizer, and regulates the reaction rate. The air bag 32 will be filled similarly to FIG. 4 with a safely breathable mixture of totally non-toxic gases. After deflation of air bag 32, the cylinder 20 will be inert and depressurized to ambient pressure.

Referring now to FIG. 10, wherein is shown the referenced fifth embodiment, in which a piston is not used. Cylinder 20 contains a mixture of pre-pressurized oxygen and inert gas (e.g. helium or argon) 66. The cylinder 20 also contains liquid fuel 68, separated from oxygen and inert gas 66 by a membrane 52.

Figure 11:
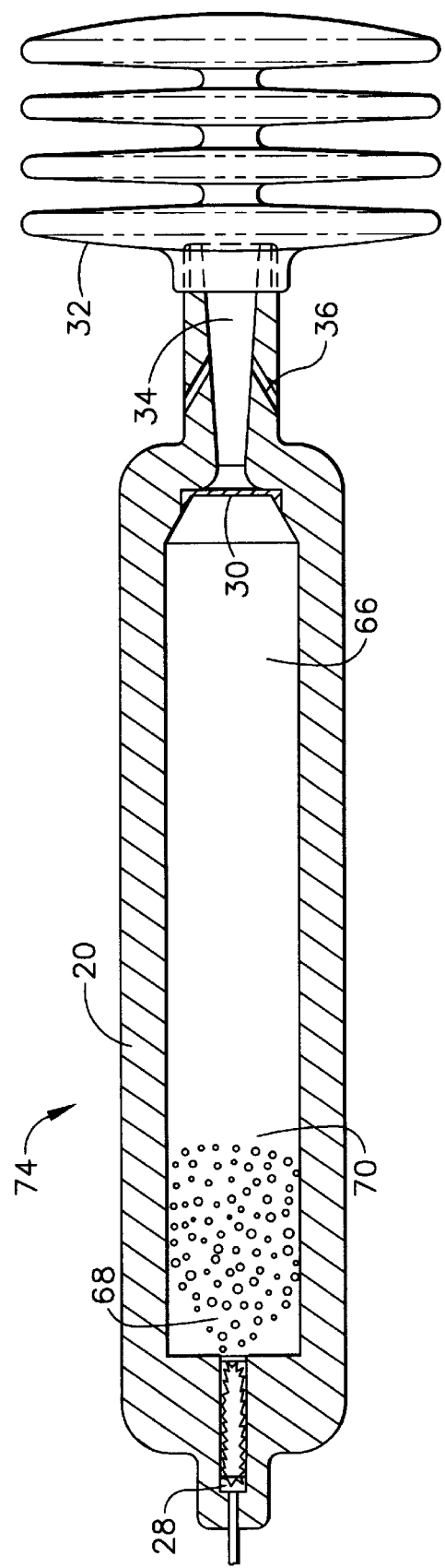

Referring now to FIG. 11, wherein is shown the same device as shown in FIG. 10, except the initiator 28 has been activated. When the initiator 28 was activated, the hot gas generated by the initiator 28 was expelled and is dispersing the liquid fuel 68 into the oxygen and inert gas 66. The hot gas and particles expelled by the initiator 28 cause the liquid fuel 68 to ignite as the liquid fuel 68 encounters the oxygen in the inert gas 66. Combustion of liquid fuel 68 is occurring along the combustion front 70 as the liquid fuel 68 (e.g. ethyl alcohol) mixes with oxygen and inert gas 66 (helium and argon). The inert gas does not play as important a roll in causing kinetic-damping in this case because combustion can only occur as fast as the fuel mixes with the oxygen. A detonation front cannot develop because the fuel is not pre-mixed with the oxidizer. The pressure in cylinder 20 will increase until the precision rupture disc 30 fails, releasing the pressurized gas in cylinder 20 into the air bag 32, as previously illustrated in FIG. 4. After the deflation of air bag 32, the cylinder 20 will also be depressurized and inert.

Figure 12:
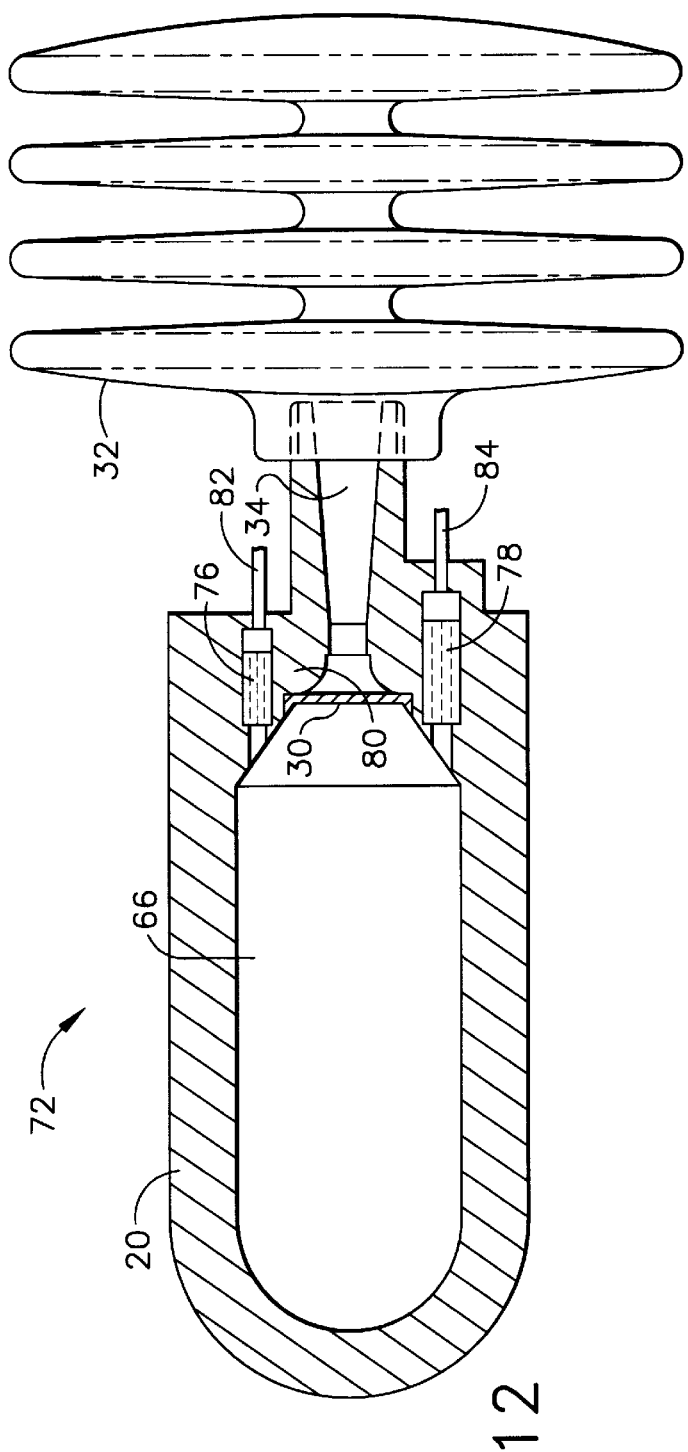

Referring now to FIG. 12, wherein is shown a device 72 similar in principle to device 74 shown in FIGS. 10 and 11, with the liquid fuel contained in a small fuel charge 76 and in a large fuel charge 78., with both charges located in the cylinder end 80. If the collision detection system of the vehicle (not shown) activates either the initiator of the small fuel charge 76, or the large fuel charge 78 (e.g. ethyl alcohol)—or both fuel charges, through leads 82 and/or 84, then the fuel from the appropriate charges will be expelled and dispersed into cylinder 20 and ignited. Only enough oxygen will be consumed to combust the quantity of fuel injected into the inert gas 66. Sufficient pressure will be developed by combustion to burst the precision rupture disc 30, regardless of which fuel charge(s) are injected. More than two different sizes of fuel charge may be used. The air bag 32 will be filled similarly to the air bag in FIG. 4 with the required quantity of a safely breathable mixture of gases. After deflation of air bag 32, the cylinder 20 will also be depressurized.

Figure 15:
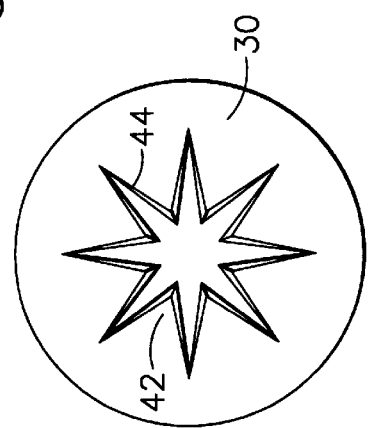
FIGS. 13, 14, and 15 are views of the rupture disc.
Figure 14:
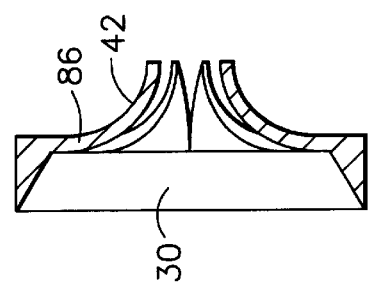
Figure 13:
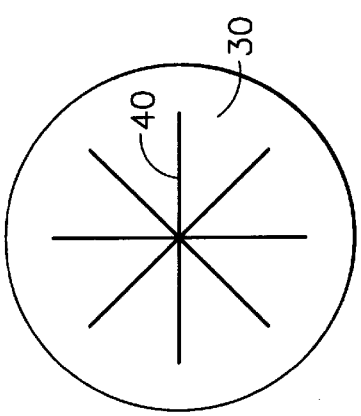

Referring now to FIGS. 13, 14, and 15 wherein is shown details of precision rupture disc 30. The rupture disc 30 is of adequate strength to indefinitely retain the pre-pressurized gas in all design variants. The sharp internal corners, of fillets, in the bottom of the shallow inscribed grooves 40 provide stress risers in the rupture disc 30 so that when gas pressure reaches a predetermined level, cracks form at the sharp fillets at the bottom of the inscribed grooves 40. The cracks propagate through to the opposite surface of the rupture disc 30, causing the rupture disc to fail, as shown in FIG. 14, thus releasing the highly pressurized gas. Failure along these grooves results in the forming of "V" shaped petals which plastically deform into their corresponding recesses at the entrance to the venturi. The shape of the entrance to the venturi acts as a kinetic energy absorber to collect the petals as they deform, not allowing the petals to be torn off and accelerated toward the venturi opening. This guarantees that no disc petals will be ejected into the air bag. The precision rupture disc 30 shown in FIG. 14 and FIG. 15 has been ruptured. The thickness 86 of the precision rupture disc 30 controls the pressure of the gas needed to cause the rupture. When the pressure exceeds the strength of the precision rupture disc, the disc ruptures along the inscribed grooves 40 in FIG. 13. This leaves petals 42 in FIG. 14 and FIG. 15 bent away due to pressure exerted by gas within the cylinder.

Figure 16:
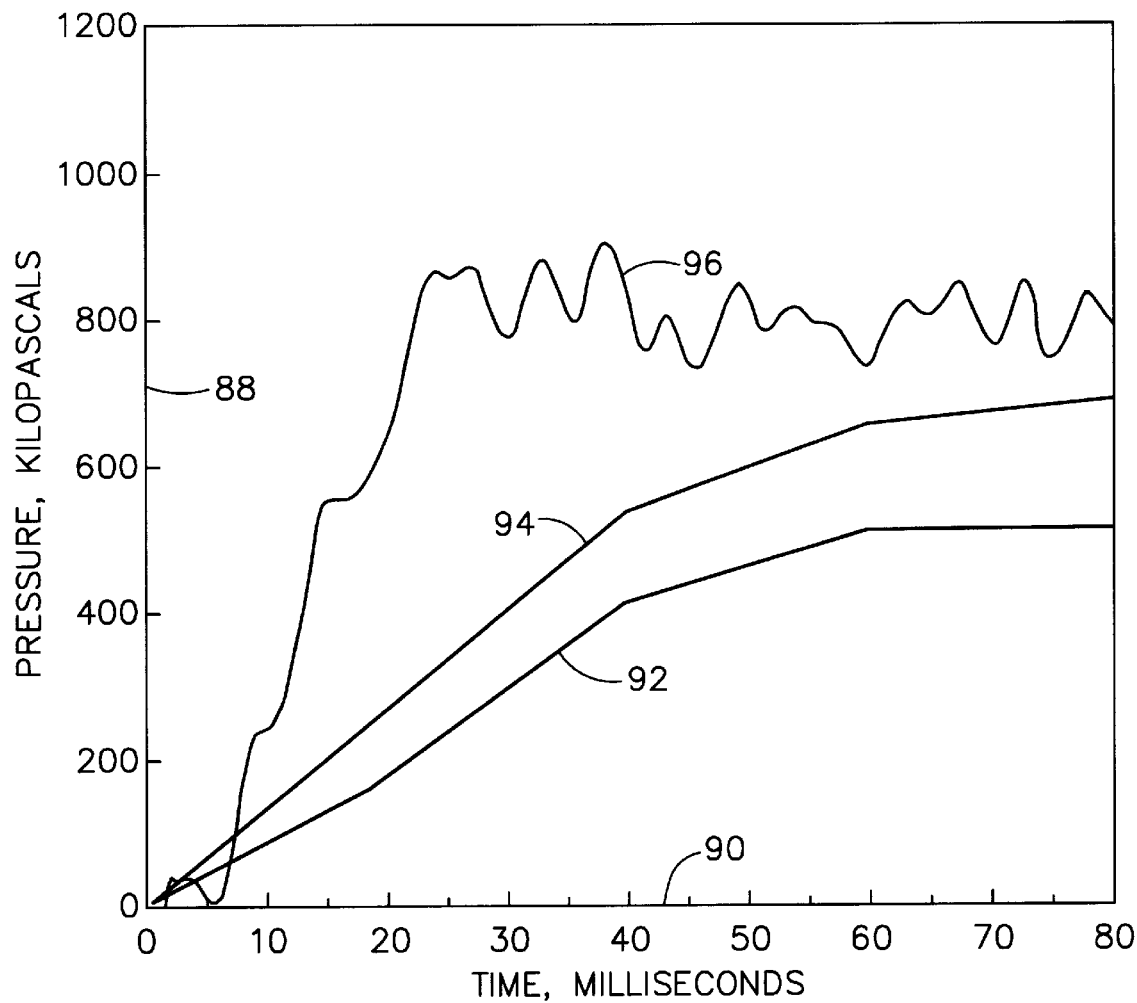
FIG. 16 is a graph showing higher and lower industry performance specifications for passenger side air bags, compared with typical output performance of the safety air bag inflation device of the present invention.

Referring now to FIG. 16 which is a graph showing upper and lower industry performance specifications for passenger side air bags compared with the typical output performance of the present invention.

The graph ordinate 88 shows pressure in kilo Pascals from 0 to 1200. (6.895 kPa=1 pound per square inch). The abscissa 90 shows time from 0 to 80 milliseconds. Lower line 92 shows the lower industry specification, while middle line 94 illustrates the upper industry specification for inflaters of this type. Together, these lines set forth model year 1999 maximum and minimum auto industry requirements for this system. Upper line 96 illustrates the pressure-time performance which the present invention is capable of producing within the size and weight requirements spelled out by the industry for devices of this type. The present invention more than adequately meets the industry specifications. As can be observed, the present invention produces pressure buildup that is both greater and earlier than industry requirements. This allows for great flexibility in the sizing, tailorability and configuration of an inflater built with the present invention technology.

Figure 17:
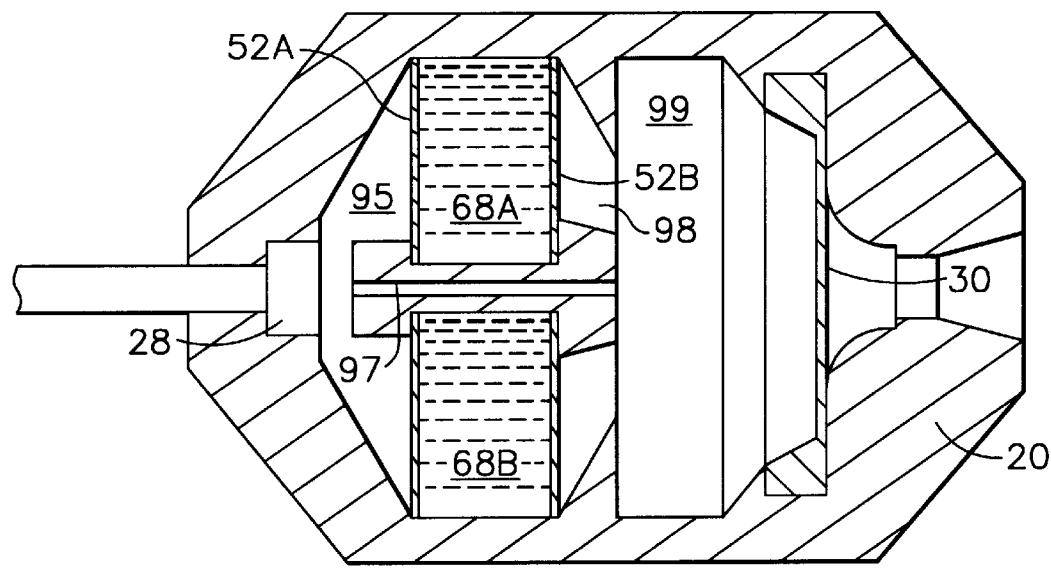
FIGS. 17 and 18 are elevational side views in section in which parts have been broken away to show operational elements as they function.

Referring now to FIG. 17 wherein is shown the device omitting the piston. The cylinder 20 contains an initiator 28, two reactive liquids fuels 68A and 68B, which are segregated from each other and sealed within their cells by membranes 52A and 52B. Reaction chamber 99 may contain a pressurized inert gas (e.g. argon or helium) sealed within the cylinder 20 by precision rupture disc 30. The reaction chamber 99 and the initiator expansion chamber 95 are connected by ignition tube 97. Therefore, the initiator expansion chamber 95 also may contain the pressurized inert gas. The ignition tube 97 equalizes the pressure between the inert gas in the reaction chamber 99 and the initiator expansion chamber 95.

Figure 18:
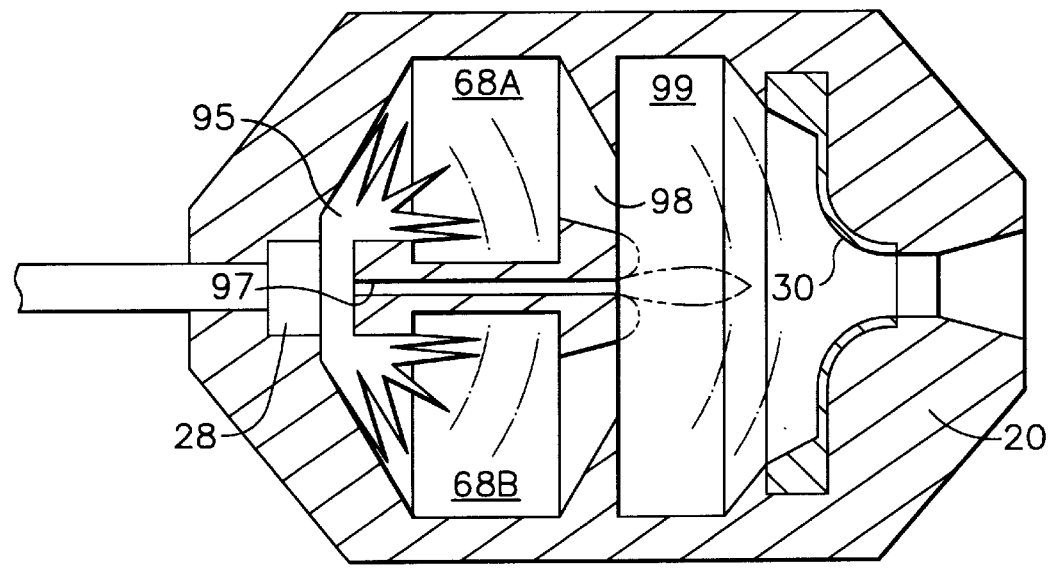

Referring now to FIG. 18 wherein is shown the same device as in FIG. 17 except that the device is functioning. The initiator 28 has functioned, filling what was the initiator expansion chamber 95 in FIG. 17 with the hot expanding gaseous combustion products and particles of the initiator 28. The hot gaseous products of the initiator 28 have ruptured the membranes 52A and 52B of FIG. 17, and are causing the injection of liquid fuel components 68A and 68B into reaction chamber 99 through injectors 98A and 99B. The action of the hot gas pressure and the geometry of the injectors is causing the liquid fuel components to atomize and become integrally mixed in the reaction chamber 99. A jet of the hot gaseous combustion products from initiator 28 has also passed through ignition tube 97 and has entered the reaction chamber 99 at the same time as the liquid fuel components 68A and 68B arrive. This jet of hot gaseous combustion products has ignited the mixing fuel components. The reaction of the liquid fuel components 68A and 68B has produced reaction product gases and heat which have increased the pressure inside the cylinder 20, bursting the precision rupture disc 30. The reaction gases are inflating the air bag, not shown.

What we claim is:

1. A safety air bag inflation device comprising:

a cylinder, said cylinder comprising a single chamber, said single chamber having an outlet in direct connection with an air bag;

kinetically damping and moderating gas stored within said single chamber;

a fuel stored within said single chamber proximate said kinetically dampening and moderating gas;

an oxidizer stored within said single chamber proximate said fuel and said kinetically dampening and moderating gas;

a precision rupture disc sealing said outlet; and an igniter which when electrically activated causes said fuel to ignite and burn, said kinetically dampening and moderating gas kinetically damping and moderating the reaction of said fuel with said oxidizer so as to slow the rate of the reaction, and produce substantially non-toxic reaction products, said burning fuel raising the pressure and temperature of said kinetically dampening and moderating gas and other gases in said cylinder, the rising pressure causing said rupture disc to rupture thereby releasing the gas to inflate said bag.

2. The inflation device of claim 1, wherein said oxidizer is oxygen and said kinetically damping and moderating gas is helium.

3. The inflation device of claim 2, wherein said fuel is a mixture of hydrogen and propane.

4. The inflation device of claim 2, wherein said fuel is a mixture of alcohol and hydrogen.

5. The inflation device of claim 1, further comprising an inert gas.

6. The inflation device of claim 1 wherein said fuel is hydrogen.

7. The inflation device of claim 1 wherein said fuel comprises greater than approximately twenty molar percent of said gas.

8. The inflation device of claim 1 further comprising a piston slidably engaged within said single chamber, wherein when said ignitor causes said fuel to ignite and burn, the increased pressure causes said piston to move toward said rupture disc causing the pressure within said chamber to increase further, the rising pressure causing said rupture disc to rupture thereby releasing the gas to inflate said bag.

9. The inflation device of claim 8 wherein said piston contacts and rupture disc after said gas is released to inflate said air bag and said piston reseals said rupture disc preventing any further gas from entering or leaving said single chamber.

\* \* \* \* \*